United States Patent Office 3,421,970
Patented Jan. 14, 1969

3,421,970
ELASTOMERIC COMPOSITION CONTAINING CHROMIC OXIDE FOR USE AS ROCKET INSULATION
James H. Daly, 258 Green Hill Drive, Tallmadge, Ohio 44278, John G. Sommer, 2236 Mayfield Road, Cuyahoga Falls, Ohio 44221, and Daniel A. Meyer, 775 New Castle Drive, Akron, Ohio 44313
No Drawing. Continuation of application Ser. No. 652,981, July 12, 1967, which is a continuation of application Ser. No. 196,498, May 21, 1962. This application Dec. 15, 1967, Ser. No. 690,765
U.S. Cl. 161—170       6 Claims
Int. Cl. C08f 45/04; C08g 51/02; B32b 5/16

ABSTRACT OF THE DISCLOSURE

The invention relates to an ablative lining as coating for insulating metals or reinforced plastics formed from a vulcanizable elastomeric composition which contains asbestos fibers and finely divided chromic oxide particles.

---

This application is a continuation of U.S. Ser. No. 652,981, filed July 12, 1967, which is a continuation application of U.S. Ser. No. 196,498, filed May 21, 1962, both now abandoned.

The combustion of rocket propellants, in the confined volume of the thrust chamber, and their ultimate release through one or more orifices usually occur under high temperatures and extremely high velocity erosive flow conditions. This places considerable stress and strain upon the gas escape orifice and other portions of the rocket structure. While the combustion of the rocket propellants is usually of short duration, the temperatures and pressure generated can destroy even the strongest and best high temperature alloys of iron, titanium, chromium, nickel, beryllium and the like unless they are protected from these conditions. As a consequence of such structural failure the rocket may be totally destroyed or only a portion such as the gas escape orifice may be destroyed. In the latter case the rocket proceeds in an erratic uncontrollable path and must be destroyed.

Attempts have been made to protect those parts of the rocket structure which may be exposed to the high temperature and erosive low conditions of the burning propellant. These attempts have principally been directed to methods of protecting the rocket structure by applying some sort of a protective coating or lining to the surfaces which are exposed to the burning propellant and hot turbulent gases. Various plastics and rubbers, both filled and unfilled, have been tried. These include phenolic resins, epoxy resins, high temperature melamine-formaldehyde coatings, ceramics, polyester resins and the like. These plastics are for the most part cured to a rigid structure. Because of the rigid structure of these plastics, upon shrinkage or expansion, cracking or blistering are encountered when they are exposed to the rapid temperature and pressure changes encountered during the burning of the propellant. Some rubber-line elastomeric systems have been used. The use of these elastomeric systems is of an ablative nature, that is the elastomer is sacrificed or consumed in a manner such that the rocket chamber is protected from the high temperatures generated during the burning of the fuel.

A more successful method of protecting the structural members of the rocket from these firing conditions is to provide a lining or coating containing an asbestos. This type coating is adapted to withstand flame temperatures and the high velocity flow conditions resulting from the combustion of liquid or solid propellants. Such coatings or linings are capable of enduring for a time sufficient to allow complete combustion of the propellant. Coatings of this type are the subject of copending application Ser. No. 153,675 (said application has been abandoned in favor of continuation-in-part application U.S. Ser. No. 519,195 filed Jan. 7, 1966, which is now U.S. Patent No. 3,347,047) which application is assigned to the assignee of the present invention. The disclosures of that application are hereby incorporated herein by reference.

Briefly stated these elastomeric coatings contain from 3 to 200 parts of an asbestos fiber per 100 parts of elastomer. They may of course contain minor amounts of other compatible substances.

Although these materials were superior in many respects to the other substance heretofore used, they were not quite as good as desired particularly in view of the constant improvement in propellants which results in even more severe combustion conditions.

Surprisingly, we have found that the addition of chromic oxide to the compounds claimed in the aforementioned application, Ser. No. 153,675, results in a much improved insulating material which is useful in rocket construction.

According to our invention at least 1.25 parts of a finely divided chromic oxide ($Cr_2O_3$) are added to an insulating composition comprising an intimate physical mixture of a heat and/or pressure vulcanizable elastomer and a fibrous form of asbestos filler which is retained on a 325 mesh screen (Tyler Screen) as determined by a wet classification test. This mixture when applied to a substrate protects it from short term flame blasts.

The amount of finely divided chromic oxide required to improve the insulating value is dependent upon particle size and on purity. The finer particle sizes, because they are more effective, are preferred. A particularly desirable particle size has been found to be about five microns. A high purity material is also prefered. A preferred material has a purity of more than 99%. In any event, using a finely divided high purity material requires, for the improved insulating value, at least 1.25 parts of chromic oxide per 100 parts of elastomeric material. There is no maximum amount but at more than 25 per 100 parts of elastomer there is no great improvement in insulating value when additional chromic oxide is added. In addition, because of the high weight of the $Cr_2O_3$ a point is reached beyond which you cannot go because of the overall weight requirements. A typical chromic oxide contemplated by our invention is sold by C. K. Williams under the designation G4099.

By the term elastomer, we mean any rubber-like substance having some degree or flexibility in the cured, vulcanized or heat, and pressure-converted state. Examples of suitable elastomers are natural rubber, butyl rubber, butadiene-styrene copolymer rubbers, nitrile rubbers, neoprene rubbers, polyurethane rubbers, silicone rubbers, chlorosulfonated polyethylene rubbers, polybutadiene rubbers, polyisoprene rubbers, fluorocarbon polymer rubbers, ethylene-propylene copolymer rubbers, and the polysulfide rubbers as well as various combinations and blends of these rubbers.

The asbestos filler must have an appreciable portion thereof composed of a relatively fibrous form in which the fibers are of definite length. Such asbestos filler is distinguishable from conventional asbestos filler materials which are made up for the most part of fines and/or floats, i.e., a substantially fine, particulate condition resulting from degradative processing.

The commercially available asbestos materials fall into two general classes, one of which is the hydrous silicates of divalent metals. The most important of the hydrous silicates is chrysotile, which is the preferred type of asbestos in accordance with the present invention.

Preferably, the chrysotile asbestos is in a fibrous form. By the term "fibrous form," we mean the material is composed of a range of various lengths of fibers. For this purpose these asbestos materials are classified according to grade in accordance with the amount of fibers which are of various fiber lengths as determined by the so-called Bauer-McNett Wet Classification Test. This test has been adopted by the Quebec Asbestos Mining Association. The equipment for making this determination is commercially available. In brief, the test involves forming a dilute slurry of a given weight of the asbestos and allowing it to pass through a series of vertical screens of decreasing openings. The Bauer-McNett Test utilizes the Tyler Series of screens.

The preferred fibrous form of asbestos is composed of at least 65 percent of fibers which are retained on a 200 mesh screen (Tyler Series) or larger as determined by the Bauer-McNett Test. In other words not over 35 percent of the fibrous form of asbestos will pass a 200 mesh screen (Tyler Series having openings 0.0029 inch). Preferably, the asbestos will have a size distribution such that at least 14 percent of the total amount of asbestos fibers will be retained on a 14 mesh screen (Tyler Series having openings of 0.046 inch) as determined by the Bauer-McNett Test. It is usually desirable and preferable to pre-dry the asbestos.

The fibrous form of asbestos should be added in amounts from about 3 to 200 parts and preferably no more than about 80 parts thereof per 100 parts of the elastomer, not including the other components of the particular recipe selected. The fibrous asbestos component can be combined with the elastomeric component on a conventional rubber mill. It is desirable to add the asbestos to the elastomer in such a manner that fiber agglomerates are avoided. The temperature of the stock during milling usually is greater than about 200° F. Subsequently, the asbestos is added gradually and evenly to the rolling bank of stock on the mill with or followed by a suitable plasticizer or dispersing agent to aid in the incorporation of the fibrous asbestos into the elastomer with a minimum of residence on the mill. Care should be taken that the spacing of the rolls is carefully controlled to accomplish the dispersion of the asbestos into the elastomeric stock without breaking down the asbestos fibers. After the asbestos is dispersed in the elastomer, the stock can be stripped from the mill and set aside for further processing. It is of course possible to adjust the spacing of the rolls of the mill at this point and strip the material off in selected widths and thicknesses for direct use as lining material for structural substrates.

The mill incorporation of the asbestos into the elastomeric stock yields a sheet in which the asbestos fibers are oriented for the most part in a direction generally parallel to the surfaces of the sheet and in alignment with the linear dimension of the sheet of stock as removed from the mill. Preferably, these fibers are also somewhat randomly arranged with some intermeshing and entanglement. It is important that the mixing be conducted so as to avoid, or to maintain at a minimum, fiber disposition perpendicular or substantially perpendicular to the surface of the sheet material.

The sheet material stripped from the mill can be further processed by calendering to yield relatively thin sheets of the asbestos-containing stock. Alternatively the material can be taken from the mill and molded directly by heat and/or pressure in a mold having the desired contour. In the latter case the stock material for molding should be preferably carefully positioned in the mold such that the flow therein is maintained at a minimum whereby the general orientation, size and form of the asbestos in the elastomeric stock is not substantially changed.

It is frequently desirable to include a second auxiliary filler in the elastomeric stock in addition to the asbestos. Examples of additional fillers are carbon black, calcium carbonate, clay, phenolics, kaolin, metallic oxides, including zinc and titanium oxides, slate flour and silica as well as various coloring pigments and dyes. Preferably, the auxiliary filler is one which has a specific gravity not greater than and preferably less than the asbestos. As a consequence, the silica type fillers such as the silica aerogels and xerogels are usually preferred. Where an auxiliary filler is used, it may be used in equal weight amounts as the fibrous asbestos, although any proportion can be used as long as the resistance of the of the lining to flame temperatures and exhaust gases under turbulent flow is not materially reduced. Generally, no more than about 80 parts by weight of an auxiliary filler per 100 parts of elastomer are practical, especially with reinforcing fillers.

When using a liquid or castable type of elastomer such as polyurethane, a nitrile, a polysulfide, a silicone system or a solvent dispersion of polymer, the asbestos filler can be incorporated therein in a dough-mixer rather than a roll mill. The viscous liquid castable sytems are not conveniently mixed on a mill as they usually run through even the smallest spacing between the mill rolls. Accordingly, a dough mixer such as a Baker-Perkins Mixer can be utilized. With these liquid castable systems asbestos fiber orientation can be achieved in the actual coating or lining operation itself.

Depending upon the viscosity of the filled stock, a brush, putty knife, trowel or the like can be so manipulated that orientation of the fibers is achieved and/or maintained during installation of the stock as a coating on a substrate. A liquid stock is permitted to flow upon the surface to be coated using careful strokes of a tool as indicated to achieve fiber orientation. Multiple coats of the material can be applied in such a system allowing sufficient time for the previous coat to set.

This type of operation provides considerable flexibility in adjusting the orientation of the fibers to meet the particular contours and design of the structural member which is being coated. In the case of a propellant chamber the coating is applied such that the asbestos fiber orientation is generally along the axis of the chamber or casing. In the case of an exit nozzle experience will determine the expected critical areas of contact by exhaust gases and turbulent flow. This critical surface area can be provided with multiple coats and with particular fiber orientation which best resist the adverse effects of heat, erosion, and high velocity gas flow.

The asbestos-filled stock can contain any of the components common to elestomeric compositions such as accelerators, catalysts, tackifiers, mill lubricants, pigments, stabilizers, plasticizers, antioxidants and the like.

The asbestos filler is preferably one of the last components to be incorporated in a stock to minimize breakdown of the asbestos fibers during mixing.

The chromic oxide may be incorporated in the elastomer prior to, simultaneously with, or subsequent to the incorporation of the asbestos. An even dispersion of the chromic oxide is desired.

Generally, the composition is cured after being applied to a substrate and prior to being exposed to flame temperatures and turbulence, but the necessity for this cure can be easily determined by a simple flame test on each different composition.

The following examples more clearly illustrate the practice of the invention. All quantities are measured by weight unless otherwise stated.

Example I

A laminate was prepared with the composition described below:

| | Parts |
|---|---|
| An elastomeric copolymer of butadiene and acrylonitrile in a mol ratio of 2:1 and having a Mooney viscosity of 70 to 90 (large rotor) 212° F. | 98 |
| Rubber grade zinc oxide (activator) | 3 |
| Symmetrical dibetanaphthyl-p-phenylene diamine (antioxidant) | 1.5 |
| Benzothiazyl disulfide (accelerator) | 1.5 |
| Coumerone-idene based resin (tackifier) | 12.5 |
| Dioctyl phthalate (plasticizer) | 12.5 |
| Stearic acid (lubricant and activator) | 2 |
| Hydrated reinforcing silica filler | 40 |
| Loose chrysotile asbestos fibers | 40 |
| KO–Blend I.S. (curative) (a latex compounded composition of 50 parts of insoluble sulfur and 50 parts of a non-staining styrene butadiene 23/77 rubber) | 4 |
| Chromic oxide | 10 |

The above listed components, except curatives and filler, i.e., silica and asbestos and the dioctyl phthalate, were mixed on a two-roll rubber mill using conventional techniques. Cold water was circulated in the rolls while the batch was mixing. The filler, other than asbestos, was added together with about 30 percent of the dioctyl phthalate plasticizer. The asbestos was then slowly added with uniform distribution of the asbestos across the width of the bank. The remainder of the plasticizer was added immediately thereafter to aid in the distribution of the fibrous asbestos as it rolled into the stock. The KO–Blend was milled in last. The mill was maintained at a setting of about 0.040 inch and the rolls were kept cool. Mixing took about 20 minutes. The resulting material was stripped off the mill and was later, in a calendering operation, formed into a sheet composed of five plies each having a thickness of 0.02 inch.

The above composition was molded into disc-shaped test specimens 2 inches in diameter and ¼ inch thick maintaining fiber orientation generally in the plane of the disc-shaped specimens and press-cured for about 60 minutes at 300° F. These cured specimens were then subjected to an oxyacetylene flame test (O/A Test) in order to determine the insulating value of the vulcanized specimens to compare the performance of the various specimens. An oxyacetylene torch having a 0.075 inch diameter nozzle was positioned with the nozzle located exactly one inch above the center of the upper surface of the specimens and normal thereto. The torch was so mounted that it could oscillate through an arc of 60° from the perpendicular changing the flame direction without moving the point of contact of the flame on the specimen surface. The purpose of this oscillation was to simulate the erosive flow conditions present during the actual firing of a propellant contained in a chamber. The oscillation was maintained at 10 cycles per minute for purposes of the test. The flow rates of oxygen and acetylene were controlled carefully so that a relative ratio of 1.1:1 was maintained to produce a reducing flame. A protected thermocouple was placed under each specimen during the test. A specimen failed if it burned through in less than 90 seconds or if it provided such poor insulation that the thermocouple reached a temperature of 400° F. in less than 90 seconds. It was generally considered that if a specimen could withstand this test it was composed of a satisfactory insulating material. The specimens were weighed before and after the test to determine their weight loss. The specimens after exposure were carefully examined, particularly the surface exposed to the flame. Examination of a diametric section of each surviving specimen revealed a lower layer of apparently unaffected material, an intermediate layer of degraded material which showed the influence of the heat and turbulent flow encountered by the oscillation of the oxyacetylene torch and a "char layer" on top. The char layer was apparently composed of carbonaceous material and residues of the fibers and fillers. This fibrous network was coated and bonded in part with carbonaceous material. The thicknesses of the respective layers were also measured. From these measurements there was calculated the important determinant, the material loss rate (MLR) in inches per second, the MLR equals $$\frac{t_o - t_v}{E}$$

where $t_0$ is the original thickness in inches of the disc specimen at its center; $t_v$ is the minimum thickness in inches of the unaffected material after exposure measured at the approximate center of the specimen and E is the time of the test in seconds. The result of the test for 90 seconds of the above composition was:

| | |
|---|---|
| Material loss rate (in inches per second) | 0.0012 |
| Weight loss (pounds) | 0.0090 |

In addition the temperature rise on the back of the sample during the test was measured and found to be 175° F.

As a control a composition the same as that of Example I except that it contained 5.0 rather than 3.0 parts of zinc oxide and no chromic oxide was compounded. When tested as Example I, the material loss rate was found to be 0.0019, the weight loss 0.0118 and the temperature rise 210° F. A comparison of these results with those of Example I readily illustrate the improvement in properties obtained by the practice of the invention. The inclusion of the chromic oxide results in a material loss rate 33% less than the control, a weight loss 20% less than the control and a temperature rise of 35° F. less than the control.

As was mentioned above the conditions of turbulent flow in a firing rocket may be quite drastic and the foregoing test is not satisfactory in predicting the behavior of the coating under these conditions. A further test which more accurately gauges behavior under actual test conditions was devised. In this test, designated the RITE Test, hot exhaust gases from a burning propellant are passed through the inside diameter of a hollow cylinder of the insulating material. The pressure varies but is usually on the order of 300 p.s.i. The material loss rate is then reported. This value has a rather high correlation to actual performance. The values were:

Compound butadiene-acrylonitrile

| | |
|---|---|
| Chamber pressure (p.s.i.) | 380 |
| Test time (seconds) | 85.0 |
| Material loss rate (inch/sec.): | |
|     Max. | 0.0073 |
|     Min. | 0.0058 |

Example II

To demonstrate that the invention is not limited to a particular type elastomer an example using a different type, isobutylene-isoprene rubber was run.

The composition employed in this example consisted of:

| | Parts |
|---|---|
| A copolymer of isobutylene and isoprene containing an average of from 1.5 to 2 isoprene units per 100 monomer units, said copolymer having a Mooney viscosity of 50 to 60 (large rotor) | 100 |
| Hydrated reinforcing silica (filler) | 40 |
| Zinc oxide (activator) | 3 |
| Stearic acid (lubricant and activator) | 1.5 |
| Tetramethyl thiuram disulfide (accelerator) | 1 |
| Benzothiazyl disulfide | 1.5 |
| Sulfur (curative) | 1.5 |
| Symmetrical dibetanaphthyl - p - phenylene diamine (antioxidant) | 1.5 |

| | Parts |
|---|---|
| Dioctyl phthlate (plasticizer) | 10 |
| Chrysotile asbestos fibers like those employed in Example I | 40 |
| KP140 (plasticizer) | 5 |
| Chromic oxide | 10 |

All of the above ingredients with the exception of the sulfur, accelerator, and the asbestos fibers were milled together on a conventional two-roll rubber mill. When an even blend had formed, the asbestos fibers were added uniformly and slowly across the lip of the band until completely incorporated. Care was taken to insure good dispersion without degradation of the fibers. The sulfur and accelerator were then milled in. The composition was then sheeted from the mill, laminated, molded into test specimens, press-cured and tested by the O/A and RITE Tests. The specimen withstood 90 second exposure and showed an average MLR of 0.0018 inch per second, a weight loss of 0.0076 pound and a temperature rise of 100° F. The RITE Test results were at a chamber pressure of 340 p.s.i. and a test time of 75 seconds. The average material loss rate was 0.0111 inch per second.

As a control the same formulation was compounded omitting the chromic oxide. When tested by the O/A Test the material loss rate was 0.0023, the weight loss 0.0089 and the temperature rise 145° F. The RITE Test results gave an average material loss rate of 0.0066 inch per second. Comparison of Example II with the control again demonstrates the advantage of the invention in that the material loss rate, weight loss, and temperature rise were considerably less than the control.

Example III

Example I was repeated except that there was substituted for the 10 parts of chromic oxide the varying amount of chromic oxide indicated in the table below. In each instance the results of the O/A Test are indicated. It can be seen that an improved value results when there are 1.25 parts of chromic oxide per 100 parts of elastomeric composition. Additions of over 25 parts of chromic oxide per 100 parts of elastomer do not result in much improved insulating value when measured by the aforementioned RITE Test. In addition, the increase in weight becomes too great to tolerate in a rocket liner.

TABLE I

| Parts of chromic oxide per 100 parts of elastomer | 1.25 | 2.50 | 5.00 | 7.50 | 10.0 | 20.0 |
|---|---|---|---|---|---|---|
| Material loss rate ($\times 10^{-4}$) (60 sec.) | 24.5 | 24.0 | 23.0 | 22.0 | 21.0 | 17.0 |

Example IV

Example I was repeated except that there was substituted for the butadiene and acrylonitrile copolymer used therein, a liquid polysulfide polymer having an average molecular weight of 1,000 and a viscosity of 700 to 1200 cps. at 80° F. The results of the RITE and O/A Tests were substantially the same as those obtained in Example I.

Example V

Example I was repeated except that there was substituted for the butadiene and acrylonitrile copolymer used therein, a liquid silicone polymer having an average molecular weight of 1,000 and a viscosity of 700 to 1200 cps. at 80° F. The results of the RITE and O/A Tests were substantially the same as those obtained in Example I.

Other elastomers of the types set out above were tried with favorable results.

The reason for the improvement in insulating value resulting from the incorporation of chromic oxide is not fully understood. The chromic oxide may function as a catalyst in the formation of the decomposition products to lower molecular weight species. Another possible explanation is that the chromic oxide causes or permits the formation of chromium carbide, an excellent insulator. It is of course possible that neither of these reactions occurs or that one or both, in addition to one or more other reactions, occur. We do not intend to be bound in the practice of our invention by limiting its practice to any of the above set forth mechanisms.

The foregoing has described an improved rocket lining or coating composition which provides resistance to flame and high velocity gas flow conditions. These improved liners of our invention permit, because of their increased effectiveness, the use of a lesser amount and thus a decreased weight, which results in better ultimate performance of the rocket.

1. A method of producing a flexible ablative coating for use in rockets and jets comprising the steps of
    (a) mixing a vulcanizable composition consisting essentially of
        (1) an elastomer,
        (2) vulcanizing agents for said elastomer,
        (3) conventional compounding ingredients for said elastomer,
        (4) from 3 to 80 parts by weight of +325 mesh asbestos fibers per 100 parts by weight of said elastomer, and
        (5) from 1.25 to 25 parts by weight of finely divided chromic oxide particles per 100 parts by weight of said elastomer;
    (b) forming said composition into a sheet;
    (c) orienting said fibers primarily in a predetermined direction approximately parallel to the surfaces of said sheet; and
    (d) vulcanizing said composition.

2. The method as defined in claim 1, wherein the elastomer recited in step (a) thereof is a copolymer derived from 90 to 99 mol percent isobutylene and 1 to 10 mol percent isoprene.

3. The method as defined in claim 1, wherein the elastomer recited in step (a) thereof is a copolymer derived from at least 50 mol percent butadiene and acrylonitrile.

4. The method as defined in claim 1, wherein the elastomer recited in step (a) thereof is a copolymer derived from at least 50 mol percent butadiene and styrene.

5. The method as defined in claim 1, wherein the elastomer recited in step (a) thereof is a diorganopolysilane.

6. A flexible ablative lining for use in rockets and jets comprising a vulcanized, resin free, elastomeric composition containing
    (a) from 3 to 80 parts by weight of +325 mesh asbestos fibers, said fibers being primarily oriented in a preselected direction approximately parallel to the surfaces of said lining, and
    (b) from 1.25 to 25 parts by weight of chromic oxide, per 100 parts by weight of the elastomer in said composition.

References Cited

UNITED STATES PATENTS

| 2,238,337 | 4/1942 | Miller | 36—77 |
| 2,821,514 | 1/1958 | Sarbach et al. | 260—29.7 |
| 2,835,107 | 5/1958 | Ward | 60—35.6 |
| 2,877,504 | 3/1959 | Fox | 18—59 |
| 3,017,746 | 1/1962 | Kiphart | 60—35.6 |
| 3,124,542 | 3/1964 | Kohn | 260—2.5 |
| 3,128,706 | 4/1964 | Rumbel | 102—98 |

MORRIS LIEBMAN, *Primary Examiner.*

S. L. FOX, *Assistant Examiner.*

U.S. Cl. X.R.

161—205; 260—37, 41, 41.5

UNITED STATES PATENT OFFICE
CERTIFICATE OF CORRECTION

Patent No. 3,421,970                                            January 14, 1969

James H. Daly et al.

It is certified that error appears in the above identified patent and that said Letters Patent are hereby corrected as shown below:

In the heading to the printed specification, lines 5 to 9, "James H. Daly, 258 Green Hill Drive, Tallmadge, Ohio 44278, John G. Sommer, 2236 Mayfield Road, Cuyahoga Falls, Ohio 44221, and Daniel A. Meyer, 775 New Castle Drive, Akron, Ohio 44313" should read -- James H. Daly, Talmadge, John G. Sommer, Cuyahoga Falls, and Daniel A. Meyer, Akron, Ohio, assignors to The General Tire & Rubber Company, a corporation of Ohio --.

Signed and sealed this 17th day of March 1970.

(SEAL)
Attest:

Edward M. Fletcher, Jr.                            WILLIAM E. SCHUYLER, JR.
Attesting Officer                                             Commissioner of Patents